United States Patent [19]
Paramo

[11] Patent Number: 4,990,813
[45] Date of Patent: Feb. 5, 1991

[54] ROLLING TRIBOELECTRIC GENERATOR

[75] Inventor: Gabriel L. Paramo, Madrid, Spain

[73] Assignee: Universidad Nacional de Educacion a Distancia, Madrid, Spain

[21] Appl. No.: 427,875

[22] Filed: Oct. 26, 1989

[30] Foreign Application Priority Data

Oct. 28, 1988 [ES] Spain ................... P8803198

[51] Int. Cl.⁵ ............................................. H02N 1/00
[52] U.S. Cl. ................... 310/309; 310/308; 322/2 A
[58] Field of Search ............ 310/308, 309, 310; 322/2 A

[56] References Cited

U.S. PATENT DOCUMENTS

| | | | |
|---|---|---|---|
| 3,086,131 | 4/1963 | Ballentine | 310/310 |
| 3,364,423 | 1/1988 | Moulton | 310/309 |
| 4,649,307 | 3/1987 | Bech | 310/83 |
| 4,760,303 | 7/1988 | Miyake | 322/2 A |
| 4,789,802 | 12/1988 | Miyake | 322/2 A |

OTHER PUBLICATIONS

Fujita, "Electrostatic Linear Actuation", Institute of Industrial Science, Transducers '87, Jun. 1987, pp. 861-864.
Carbauh, "Electrets-Applications Unlimted", Highway Research Board, NAS, Washington D.C., Electrets and Related Phenomena, QC585.E36, May '68 pp. 100-101.
J. Chappins, Lecons de Physique Generale, vol. II Gauthier—Villans, Paris 1920.
A. More, Electrostatics and its applications—Wiley, New York 1973.
W. Harper—Contact and Frictional Electrification—Oxford, at the Clarendon Press, 1967.

Primary Examiner—Peter S. Wong
Assistant Examiner—D. L. Rebsch
Attorney, Agent, or Firm—Frishauf, Holtz, Goodman & Woodward

[57] ABSTRACT

A triboelectric device in which electrical charges are obtained by a rolling process between two rigid dielectric surfaces of appropriate materials, one of which may be planar. There exists therein no injection of electrical charges originating from outside. The separation of the charges with the concomitant generation of electrical potentials is effected by the movement of the parts by triboelectrification. Such devices are useful in the construction of electrostatic generators for teaching, research or industry and as an essential supply for fixed or portable ignition devices for boilers, cookers and gas burners.

20 Claims, 2 Drawing Sheets

ROLLING TRIBOELECTRIC GENERATOR

BACKGROUND OF THE INVENTION

Devices intended to generate electromotive forces are usually based on electromagnetic or electrochemical phenomena. So-called (although incorrectly) electrostatic generators or machines use processes which basically involve coulomb forces The former generally provide high currents at low voltages; the latter usually supply weak electric currents at very high voltages. Electrostatic machines played an important role in early discoveries in the field of electricity. Nowadays, they have been relegated to specific research or industrial uses, such as, for example, the supply of high voltages for particle accelerators and for separators or precipitators.

In 1766, Ramsden constructed an electrostatic friction generator in which electrification was achieved by means of friction between glass and leather impregnated with tin bisulphide. Volta, Holtz and Voss (Chappins, J., Lecons de Physique Générale, Vol. II, Gauthier—Villans, Paris 1920), at around the same time, manufactured electrical machines (also called at that time electrophori) taking as a basis the phenomenon of electrification by induction or "influence". In 1883, J. Whimshurst invented his ingenious electrostatic machine which was for many years preferred by scientists and which is still used today, albeit rarely. A major advance in the field of electrostatic generators was made by R. J. van der Graaf who designed the generator which bears his name and which is currently the one in most use, both in small and in large sizes. (More, A., Electrostatics and its applications. Wiley. New York 1973). The "peletron" is a modified Van der Graaf generator using a system which is similar to an endless belt. In the Oak Ridge (USA) laboratory there is a peletron coupled to a 25 MV accelerator. Modern generators are usually accommodated in hermetic chambers which are filled at high pressures with some suitable gas, such as $F_6S$, which prevents dielectric breakdown and the harmful effects of environmental humidity The generator which is proposed here can also operate in a hermetic enclosure and any chosen atmosphere and at the appropriate pressure. If the "coaxial" arrangement is adopted, which is one of those proposed, the external cylinder can act simultaneously as the container to be filled by the gas.

In the historical sequence of electrostatic generators, those which are proposed here have individual characteristics as set forth hereinbelow in greater detail. Various basic mechanisms are offered, based on electrifying contacts achieved by rolling, which avoids the mechanical restrictions inherent in friction. Rolling is proposed as a method of electrification and generation of voltages.

On the basis of rolling, various designs of electrostatic generator are proposed, i.e. designs of a device which situates accumulations of electrical charges of opposite sign at separate locations in space. Various proposed designs have a symmetrical configuration both in terms of the mechanical aspect and in terms of the aspect of electrical functionality, which constitutes an original element. As a non-exclusive example, mention should be made of the device in FIG. 3 if the same radius is given to all the cylinders. In the coaxial arrangement (FIG. 6) there is a certain mechanical symmetry in respect of the elements assigned to each charge, but symmetry in electrical functionality.

The coaxial design (FIG. 6) also offers the particular feature that the entire electric field generated by the device is confined within the physical limits of the device, avoiding losses and interferences.

The electrostatic generator proposed in the present specification has, among other features, the novelty of its design, the originality of its operation, the simplicity of its basic construction, the possibility of grouping its basic elements together in a modular fashion and its adaptability to different performance requirements or demands.

The generator proposed herein is called "triboelectric" because it is based on the so-called "triboelectric" properties of some materials and "rolling" because it benefits from the electrification produced by rolling in triboelectric materials.

"Triboelectrification" is the process by means of which, by placing two specific materials in surface contact, accumulations of electrical charges of respectively opposite signs are produced on said surfaces. The phenomenon originates in the transfer of electrons close to the surface from one material to the other. In order for triboelectrification to take place, it is not essential for one surface to cause friction on the other. If the triboelectrified media are insulating, the accumulations of charges will persist when there is no longer any contact between the surfaces of the media.

By trying out different pairs of materials, "triboelectric series" have been established, or rather ordered lists of materials which are positively electrified by contact with those which precede them and negatively electrified by contact with those which follow them. As an example, mention is made of that formulated by Montgomery and reproduced by W. Harper in his work "Contact and Rollingal Electrification" (Oxford, at the Clarendon Press, 1967); wool-nylon-cellulose-silk-cellulose acetate-methyl methacrylate-dacron-orlon-polyvinyl chloride-dynel-velon-polyethylene-teflon.

SUMMARY OF THE INVENTION

The rolling triboelectric generator which is the subject of the invention is intended to obtain electromotive forces and comprises active components or parts which, by means of triboelectrification, generate electrical charges, positive and negative respectively, in equal quantity; and at least two parts or components collecting said charges and intended for the transmission of said charges to terminals outside the generator.

According to one aspect of the invention, the active parts or elements of the generator comprise one or more pairs of solid bodies of materials which are suitable and distinguished from one another (for example, nylon and teflon) which occupy separate positions in the so-called "triboelectric series" and which are intended to roll on one another, generating electrical charges of opposite signs which appear separately in the bodies of different materials and situated at unequal electrical potentials.

According to another aspect of the invention, the parts or components which form the active pairs possess external surfaces which permit rolling of one on another, wherein one of them is plane and the other cylindrical, or wherein the two surfaces are cylindrical.

According to yet another aspect of the invention, the mutual rolling surfaces between the active parts have a finish which is smooth or grooved in the manner of a gear or rack, the latter in the case of parts with a plane surface.

The collecting parts or components of the triboelectric generator are solid bodies, at least at the surface, which conduct electricity and are suitable for transferring the electrical charges to the terminals outside the generator.

According to another aspect, the collecting elements possess plane or curved surfaces by means of which they are in rolling contact with the respective active parts, the rolling surfaces having a finish which is smooth or grooved in the manner of a gear or rack.

According to a preferred aspect of the invention, the active parts and collecting parts have the form of a cylinder or roller with smooth or grooved surfaces.

According to a particularly important aspect of the invention, the collecting parts or components comprise two cylindrical parts which are coaxial and concentric, the outermost of which is hollow and is provided with a certain number of pairs of active parts which are dimensioned and positioned in such a way that they can perform rolling movements relative, respectively, to the inner face of the external collecting part and to another active component which, in turn, will roll on the outer face of the inner collecting cylinder, all the surfaces of the components mentioned being smooth or grooved.

According to yet another aspect of the invention, the active parts have the form of a roller and the collecting parts are of plane form.

Another aspect of the generator which is the subject of the invention resides in that the individual active components, in whatever form, are grouped together in series or in parallel or alternatively in mixed form, it being possible, in the first case, to adapt two intermediate collecting parts into a single part common to the two modules thereby grouped together.

DETAILED DESCRIPTION

Figure 1:
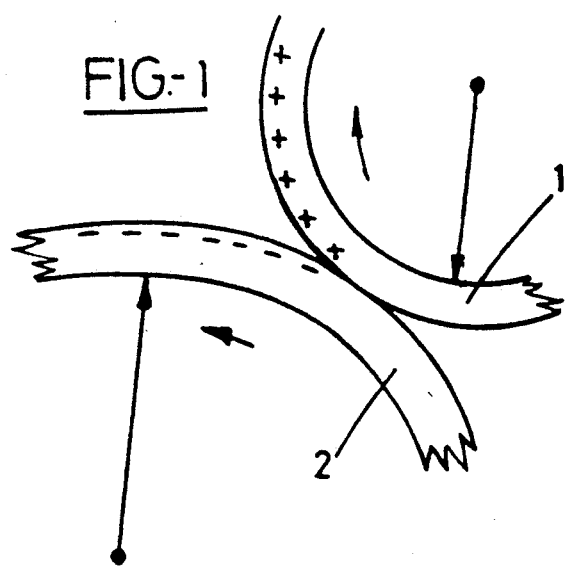
FIG. 1 shows two solid elements of triboelectric nature in transverse section.
Figure 2:
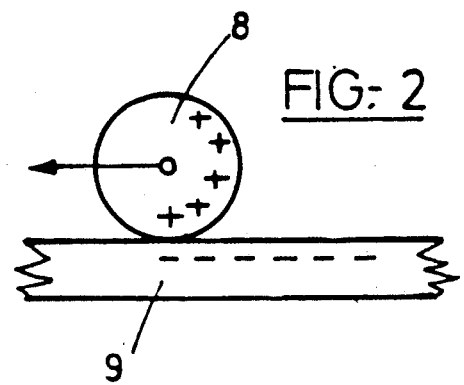
FIG. 2 shows the formation of surface charges between triboelectric components.

Rolling is a form of contact between two surfaces which is produced in successive form and which is possible only when at least one of the two surfaces is curved. As non-limiting examples, mention may be made of the rolling between two cylindrical surfaces and between one plane and another cylindrical surface. When there is rolling between two solids 1,2 of triboelectric nature, the areas where there has been rolling remain charged at the surface with electric charges of opposite signs, as illustrated in FIG. 1. FIG. 2 illustrates the formation of surface charges as a result of rolling between triboelectric media, one of which has a plane surface 9 and the other has the form of a cylinder or roller 8. The arrow indicates the direction of advance of the center of the roller 8. The signs of the charges depend on the respective nature of the materials.

Figure 3:
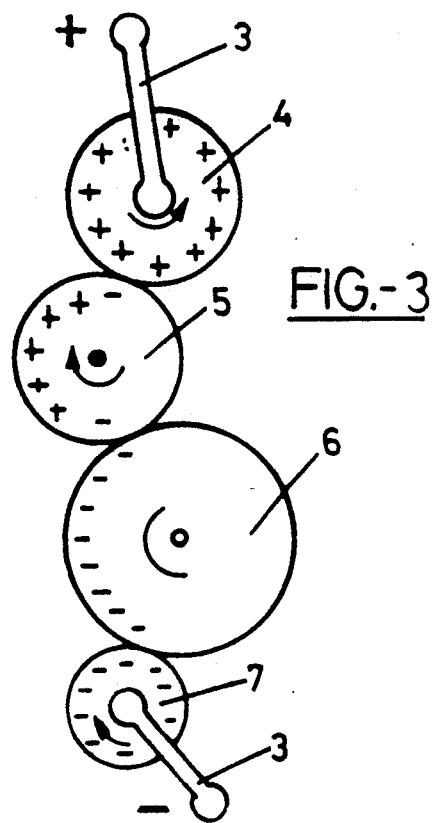
FIG. 3 shows a first embodiment of the triboelectric generator according to the invention.

The electrical charges generated by rolling on a surface may be removed therefrom by another rolling involving a third surface (plane or curved, as appropriate) of material which conducts electricity and which acts as a collecting device. FIG. 3 illustrates this process: the cylinders 5 and 6, shown in section, are made of materials which are suitable for the rolling between them to cause triboelectrification; the cylinders 4 and 7 are made of conducting material and, in rolling thereof with the above, act as collectors collecting the electrical charges In the device shown diagrammatically in FIG. 4, triboelectrification is due to rolling between a plane 10 and a cylinder or roller 11 and the charges are collected by means of the conducting cylinders 12 and 12'. In the arrangement of the generator shown in FIG. 5, the collecting parts are the plane parts 13 and 14 and in the configuration of FIG. 6 the conducting and collecting elements are the concentric tubes 17 and 18 shown in section. In the modular device shown in FIG. 7, the cylinders or rollers which collect the charges are drawn by means of circles of small diameter, the circles of large diameter corresponding to cylinders or rollers of triboelectrifiable materials.

Having established the operating principles, it is appropriate to define the essential elements of the device proposed, which are:

(A) At least two active parts or components of suitable and different materials according to a triboelectric series. At least one of them will have a curved surface.

(B) The collecting parts or components constructed from materials which conduct electricity. There has to be at least one collecting part or collector for each sign of the electrical charges. The surface thereof may be plane or curved when they collect the charges from an active roller, and will necessarily have to be curved when they collect charges accumulated on a plane surface.

(C) The terminals of the device connected respectively to the positive and negative collectors and capable of acting as contact outlets in order to act on external devices.

The device operates when there is rolling between the active components and between the active components and the collectors, all driven by an external mechanical agent. This movement gives rise to accumulations of charges in the active components, which charges are transferred to the collectors and (via external terminals) to the external devices receiving electrical charges and currents. An electromotive force arises between said terminals during operation of the device.

The electrical energy involved during operation of this device originates from the mechanical energy supplied by the external mechanical agent which determines the rolling process. The nature, characteristics and form of application of this mechanical action lie outside the subject of this patent. This mechanical action may be applied in several ways and may directly affect one or more of the essential elements of the device which were mentioned above. The plane parts which can, alternatively, form the active elements and the collectors permit, in relation to a rolling, mutual movements which are basically those of translation. When the form thereof is cylindrical, they permit rotations and translations. The rolling results, in each case, from relative combinations of these types of movements.

According to the description of the essential elements and the operating principles, various proposals of rolling triboelectric generators are defined, which are based on said essential elements and on said basic operating principles, as described in the figures mentioned.

FIG. 3 illustrates a proposal or construction which may be considered basic or fundamental. The active parts are two cylinders 5 and 6 of arbitrary and not necessarily equal radius, suitable for rolling on one another. Each one of them is in permanent rolling contact with a collecting cylinder 4 and 7 which, in turn, are each provided with respective terminals 3. The radii of the different cylinders or rollers do not necessarily have to be equal: their values are arbitrary, although they may also be equal. The axes of the different cylinders or rollers have to be parallel, but not necessarily all coplanar. The surface of may be smooth. It may also be provided with teeth so that it has the form of a straight or helical gear. The cylinders having surfaces in form of gears increase the contact surface, enhancing the generation of surface charges, and facilite the entrainment or all of them, thereby enabling applying the external mechanical agent to one or all of them.

Figure 4:
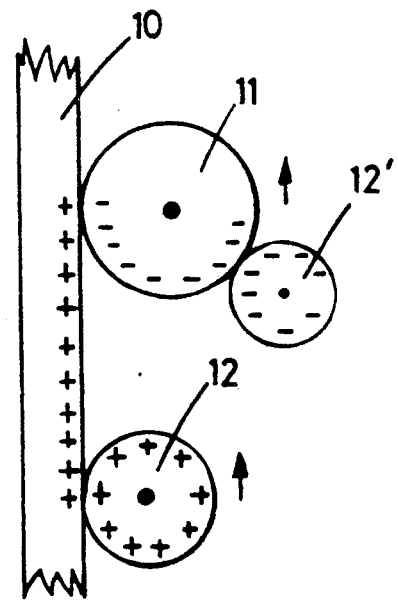
FIG. 4 shows a second embodiment of the triboelectric generator according to the invention.

In the arrangement shown in FIG. 4, the active elements are the plane part 10 and the cylinder 11. The collecting elements are the rollers, smooth or provided with teeth, which are identified by the numbers 12 and 12'. When the cylinders, in this arrangement, are provided with teeth, the plane part has to be made in the form of a rack. In this case, electromotive forces are generated by virtue of the relative movement of the parts which remain in contact.

Figure 5:
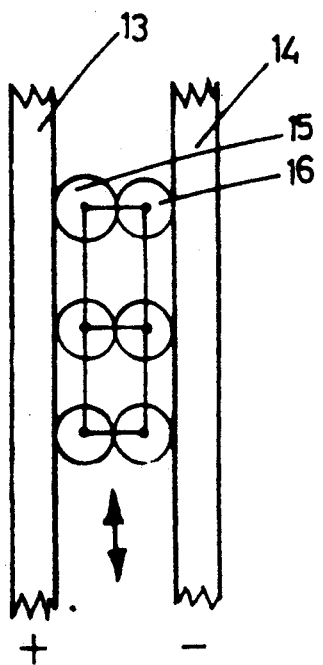
FIG. 5 shows an arrangement of cylindrical active elements together with plane collecting elements.

According to the arrangement shown in FIG. 5, the active elements, forming pairs, are organized in series, being held in suitable relative positions by means of a retaining structure. As a non-limiting example, in FIG. 5, the existence of three pairs of active elements 15,16 as been assumed. Their form is cylindrical. The collecting parts are plane in character 13 and 14. Both the plane elements and the cylindrical elements may be smooth on the surface or may be provided with grooves or teeth which couple or mesh together. Electromotive forces are generated when the "series" of active elements is displaced relative to the plane parts, causing rolling which determines both the generation and accumulations of and collection thereof by the plane collectors.

Figure 6:
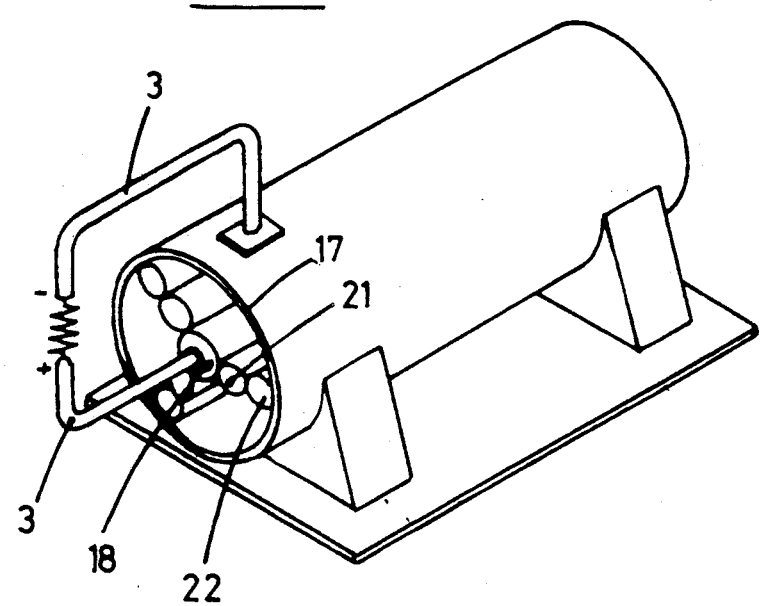
FIG. 6 shows a third and more important embodiment of the triboelectric generator according to the invention.

In the arrangement of the elements shown in FIG. 6, the active elements 21 and 22 have the form of pairs of cylinders or rollers or toothed) in permanent contact another and with two concentric cylinders 17 and 18 which act as collectors, the larger 17 of which is hollow. The active pairs (at least one) are accommodated in the space between the two collecting cylinders whose surfaces intended for rolling are smooth or toothed according to the nature of the surface of the active rollers. In FIG. 6, a generator is shown as a non-limiting example, with three pairs of active elements. The choice of the radii f the respective parts is such that permanent contact is ensured during rolling between the inner face of the outer collector cylinder 17 and the outer surface of the active element or elements of one sign, and also that permanent contact is ensured between the outer face of the inner collector cylinder 18 and the active roller or rollers of the other sign. Permanent contact during rolling must also be ensured in respect of each active cylinder and its companion or complementary component. In this case, electromotive forces are generated by any of the r movements of the parts or elements, by means of which relative movements rolling is produced between the rollers and cylinders involved.

Figure 7:
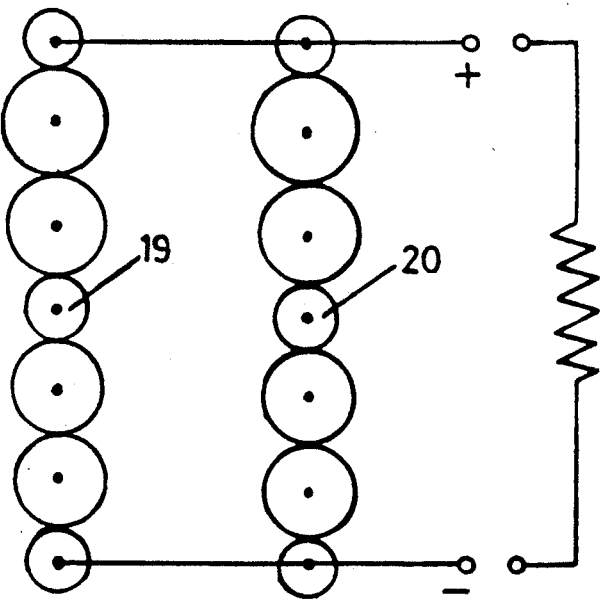
FIG. 7 shows the grouping of several individual modules.

FIG. 7 shows the grouping together of various individual modules. The grouping together of various modules with the characteristics of that described in FIG. 3 has been taken as a non-limiting example. The left-hand branch and the right-hand branch each include various modules (to be exact, two) grouped together in series. The two collecting elements by means of which the series connection is established, 19 and 20, may be adapted into a single element. The grouping together of modules in series increases the voltage between external terminals. In turn, the two branches (each comprising two series-connected groups) are connected in parallel, which increases the current supply. In FIG. 7, the larger circles show, in section, the active rollers, and the smaller circles show, in section, the collecting cylinders.

I claim:

1. A rolling-type triboelectric generator for obtaining electromotive forces without using external charge sources, comprising:
   a plurality of wide active components having external surfaces, at least one of said active components having an external surface which is mutually rollable on an external surface of another of said active components;
   a plurality of wide electrical charge collecting components having electrically conducting surfaces, said electrically conducting surfaces of said charge collecting components being arranged for mutual rolling on wide external surfaces of respective active components;
   said active components comprising respective materials occupying different positions in the triboelectric series, and serving as triboelectrification generators of positive and negative electrical charges in equal quantity separated in the components of different materials and having unequal electrostatic potentials; and
   said collecting components comprising at least two collecting bodies having solid electrically conducting portions at least at the surfaces thereof which are arranged for said mutual rolling on said respective active components; and
   means coupled to said collecting components for transferring electrical charges generated by said mutual rolling from solid electrically conducting portions at the surfaces of said at least two collecting bodies to external terminals.

2. The triboelectric generator of claim 1, wherein at least one of said external surfaces of said active components and said electrically conducting surfaces of said collecting components is a substantially plane surface.

3. The triboelectric generator of claim 2, wherein at least one of said external surfaces of said active components and said electrically conductive surfaces of said collecting components is a substantially curved surface.

4. The triboelectric generator of claim 1, wherein at least one of said external surfaces of said active components and said electrically conductive surfaces of said collecting components is a substantially curved surface.

5. The triboelectric generator of claim 1, wherein said active components comprise at least one pair of mutually differentiated solid bodies.

6. The triboelectric generator of claim 2, wherein mutually rollable surfaces between plane active components are smooth.

7. The triboelectric generator of claim 2, wherein mutually rollable surfaces between a plane active component and a plane collecting component are toothed.

8. The triboelectric generator of claim 7, wherein said plane toothed mutually rollable surfaces comprises a rack and gear arrangement.

9. The triboelectric generator of claim 1, wherein said active components and said collecting components have cylindrical or roller shapes.

10. The triboelectric generator of claim 9, wherein said outer surfaces of at least a pair of said active and collecting components are smooth.

11. The triboelectric generator of claim 9, wherein said outer surfaces of at least a pair of said active and collecting components are grooved.

12. The triboelectric generator of claim 1, wherein at least one of said active and collecting components has a cylindrical or roller shape.

13. The triboelectric generator of claim 1, wherein at least one of said active components, and wherein at least one of said collecting components, each have cylindrical or roller shapes.

14. A rolling-type triboelectric generator of claim 1, wherein said collecting components comprise a pair of spaced apart mutually facing planar components of electrically conducting material; and said active components being arranged between said spaced apart collecting components, said active components, being provided in pairs which are mutually rollable on each other, and which are rollable on respective planar collecting components.

15. The triboelectric generator of claim 14, wherein said pairs of active components are connected together in parallel to increase the current capacity.

16. The triboelectric generator of claim 14, wherein said pairs of active components are connected together in series to increase the voltage capacity.

17. A rolling-type triboelectric generator for obtaining electromotive forces without using external charge sources, comprising:

a plurality of wide active components having external surfaces, at least one of said active components having an external surface which is mutually rollable on an external surface of another of said active components;

a plurality of wide electrical charge collecting components having electrically conducting surfaces, said electrically conducting surfaces of said charge collecting components being arranged for mutual rolling on wide external surfaces of respective active components;

said active components comprising respective materials occupying different positions in the triboelectric series, and serving as triboelectrification generators of positive and negative electrical charges in equal quantity separated in the components of different materials and having unequal electrostatic potentials;

said collecting components comprising at least two coaxial and concentric cylindrical collecting parts, at least an outermost of which is hollow;

said active components being arranged between said coaxial and concentric collecting parts and performing rolling contact movements relative, respectively, to an inner face of said outermost collecting part and to another active component, said another active component in turn performing a rolling contact movement on an outer face of an innermost collecting part; and means coupled to said collecting parts for transferring electrical charges generated by said mutual rolling from solid electrically conducting portions at the surfaces of said at least two collecting parts to external terminals.

18. The triboelectric generator of claim 17, wherein all of the mutual rolling surfaces are smooth.

19. The triboelectric generator of claim 17, wherein at least two of the mutual rolling surfaces are grooved.

20. The triboelectric generator of claim 19, wherein said active components and said collecting components are grouped together in series, and said collecting component including an intermediate collecting element of a series grouping which is common to at least two of the active components of a series grouping.

* * * * *

UNITED STATES PATENT AND TRADEMARK OFFICE
CERTIFICATE OF CORRECTION

PATENT NO. : 4,990,813

DATED : February 5, 1991

INVENTOR(S) : Gabriel Lorente Paramo

It is certified that error appears in the above-identified patent and that said Letters Patent is hereby corrected as shown below:

TITLE PAGE:

1.  Section [75] Inventor:   --Gabriel Lorente Paramo--.

2.  Delete:

"Section [30] Foreign Application Priority Data
    Oct.28, 1988 [ES]   Spain.....P8803198"

3.  Insert under Section [56] "References Cited":

--FOREIGN PATENT DOCUMENTS

DE-C- 58,777   1891   GERMANY--

Signed and Sealed this

Fifteenth Day of September, 1992

Attest:

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO.   :   4,990,813
DATED        :   February 5, 1991
INVENTOR(S)  :   Gabriel Lorente Paramo It is certified that error appears in the above-identified patent and that said Letters Patent is hereby corrected as shown below:

TITLE PAGE -

In Section [56] References Cited, insert under "Foreign Patent Documents", the following:

--BE-A-697,718   1967   Belgium--.

Signed and Sealed this

Fourteenth Day of September, 1993

Attest:

BRUCE LEHMAN

Attesting Officer      Commissioner of Patents and Trademarks